United States Patent
Ghillebert et al.

(10) Patent No.: US 9,849,615 B2
(45) Date of Patent: Dec. 26, 2017

(54) INJECTION MOULD FOR SAWING CORD, METHOD TO PRODUCE SAWING CORD AND THE SAWING CORD RESULTING THEREFROM

(71) Applicant: NV BEKAERT SA, Zwevegem (BE)

(72) Inventors: Dieter Ghillebert, Roeselare (BE); Raf Clauws, Desselgem (BE); Tom Baekelandt, Zwijnaarde (BE)

(73) Assignee: NV BEKAERT SA, Zwevegem (BE)

( * ) Notice: Subject to any disclaimer, the term of this patent is extended or adjusted under 35 U.S.C. 154(b) by 799 days.

(21) Appl. No.: 14/368,870

(22) PCT Filed: Dec. 13, 2012

(86) PCT No.: PCT/EP2012/075407
§ 371 (c)(1),
(2) Date: Jun. 26, 2014

(87) PCT Pub. No.: WO2013/102542
PCT Pub. Date: Jul. 11, 2013

(65) Prior Publication Data
US 2014/0374954 A1    Dec. 25, 2014

(30) Foreign Application Priority Data

Jan. 5, 2012 (EP) ..................... 12150240

(51) Int. Cl.
*B29C 45/14*    (2006.01)
*B29C 45/00*    (2006.01)
(Continued)

(52) U.S. Cl.
CPC ........ *B29C 45/0046* (2013.01); *B23D 61/185* (2013.01); *B23D 65/00* (2013.01);
(Continued)

(58) Field of Classification Search
CPC ...... B23D 61/185; B23D 65/00; B28D 1/124; B29C 2045/14877; B29C 45/0046; B29C 45/14549; B29C 45/14565; B29L 2031/77
See application file for complete search history.

(56) References Cited

U.S. PATENT DOCUMENTS 3,219,743 A    11/1965    Berler
5,216,999 A    6/1993    Han
(Continued)

FOREIGN PATENT DOCUMENTS

EP    0719628    *    7/1996
GB    921879         3/1963
(Continued)

OTHER PUBLICATIONS

Electronic translation of JP 2002-321257.*

*Primary Examiner* — Jill Heitbrink
(74) *Attorney, Agent, or Firm* — Foley & Lardner LLP (57) ABSTRACT

In a sawing cord the three constituting elements of steel cord, sawing bead and sleeve polymer in between the beads must work optimally together. In order to improve the injection molding quality the inventors disclose an injection mold wherein the injection channels inject polymer from opposite sides of the steel cord into the injection cavity. The injection mold comprises two half molds that form the injection cavity when closed. Different preferred embodiments are described inclusive the use of channels having a tree structure, preferably a binary channel tree, preferably a balanced binary tree and most preferred a balanced binary tree with equal length pathways from feed channel to each injection channel. The use of heated channels is disclosed and the rules for balancing between the number of heated versus non-heated channels are explained. Furthermore the method to use such mold and the product resulting from the use of the mold are claimed.

17 Claims, 4 Drawing Sheets

(51) Int. Cl.
  *B23D 61/18* (2006.01)
  *B23D 65/00* (2006.01)
  *B28D 1/12* (2006.01)
  B29L 31/00 (2006.01)
  B29K 305/00 (2006.01)

(52) U.S. Cl.
  CPC ........ *B28D 1/124* (2013.01); *B29C 45/14549* (2013.01); *B29C 45/14565* (2013.01); *B29C 2045/14877* (2013.01); *B29K 2305/00* (2013.01); *B29L 2031/77* (2013.01)

(56) References Cited

U.S. PATENT DOCUMENTS

2007/0194492 A1    8/2007  Floratti
2007/0200275 A1*   8/2007  Stefano .................. B23D 61/04
                                                        264/275

FOREIGN PATENT DOCUMENTS

JP        2002-321257    * 11/2002
WO    WO 2011/061166 A1    5/2011

* cited by examiner

INJECTION MOULD FOR SAWING CORD, METHOD TO PRODUCE SAWING CORD AND THE SAWING CORD RESULTING THEREFROM

TECHNICAL FIELD

The invention relates to a mould for coating a sawing cord with polymer by injection moulding, a process to coat a sawing cord with polymer and a sawing cord obtained by such a process.

BACKGROUND ART

Sawing cords enjoy increased interest for sawing natural stone blocks into slabs for all kinds of applications. Sawing cords are replacing the traditional lamella and circular saw blades as they allow for higher linear speeds (typically 100 to 120 km/h) and hence higher cutting speed. Stone cutting machines with as much as 60 or more closed loops of sawing cords running parallel on grooved sheaves are being introduced nowadays. Such machines attain higher productivity and reduce the overall operational cost for the stone cutters compared to the existing gang saws and are replacing this technology at high pace.

In essence a sawing cord comprises three basic elements:
A central carrier cord that is made of steel filaments twisted together into a cord. The steel cord has a diameter of about 5 mm or 3.5 mm while lower diameters such as 3 mm or even 2 mm are being explored nowadays;
Sawing beads attached to the cord at regular distances. The number of beads per meter depends on the type of stone that needs to be cut. There are about 25 to 40 beads per meter on a sawing rope. The beads themselves exist out of a metal sleeve on which an abrasive layer is attached. This abrasive layer comprises diamond grit held in a metal matrix. The abrasive layer is currently obtained by powder metallurgical techniques although beads wherein the abrasive layer is applied by laser cladding are being tested. The total diameter of the bead is 7 or 11 mm depending on the application envisaged. The beads are threaded on the steel carrier rope in much the same way as pearls on a necklace;
The beads must be fixed to the carrier such that the motive force exerted on the steel rope is transferred to the bead. While in the past mechanical anchorage methods have been explored, the technology whereby beads are held in place by means of a polymer has prevailed. The polymer is injected in between the beads thereby forming sleeves surrounding the steel cord. In this way the steel cord is sealed from the coolant and the abrasive debris sawn away by the beads. A good adhesion chemistry helps to keep the sleeves fixed to the steel cord while holding the beads firmly in place. Bad polymer adhesion may lead to 'bead collapse': beads accumulate on the cord when one of them gets trapped in the cut.

The three elements of a sawing cord must cooperate well together: the steel cord must have sufficient fatigue resistance, the sawing beads must gradually expose the diamond grit from the metal matrix while the polymer must keep its adhesion to the steel cord: a premature failure of any one of these results in a premature failure of the entire rope.

After analysing many failed sawing ropes, the inventors found that one of the predominant failure modes is cord failure at the end of the metal sleeve of the bead. One of the causes of this failure mode is that the rope is not exactly at the centre of the sleeve of the bead: the steel cord touches the metal sleeve. The effect of this contact is that the outer filaments of the steel cord will wear and corrode at that place leading to a premature failure of the rope. Furthermore an eccentric placement in the same radial direction of the steel rope in a series of beads may lead to a non-rotating sawing rope during use. For a uniform wear of the abrasive surface of the circular beads it is imperative that the beads rotate during use.

Figure 1:
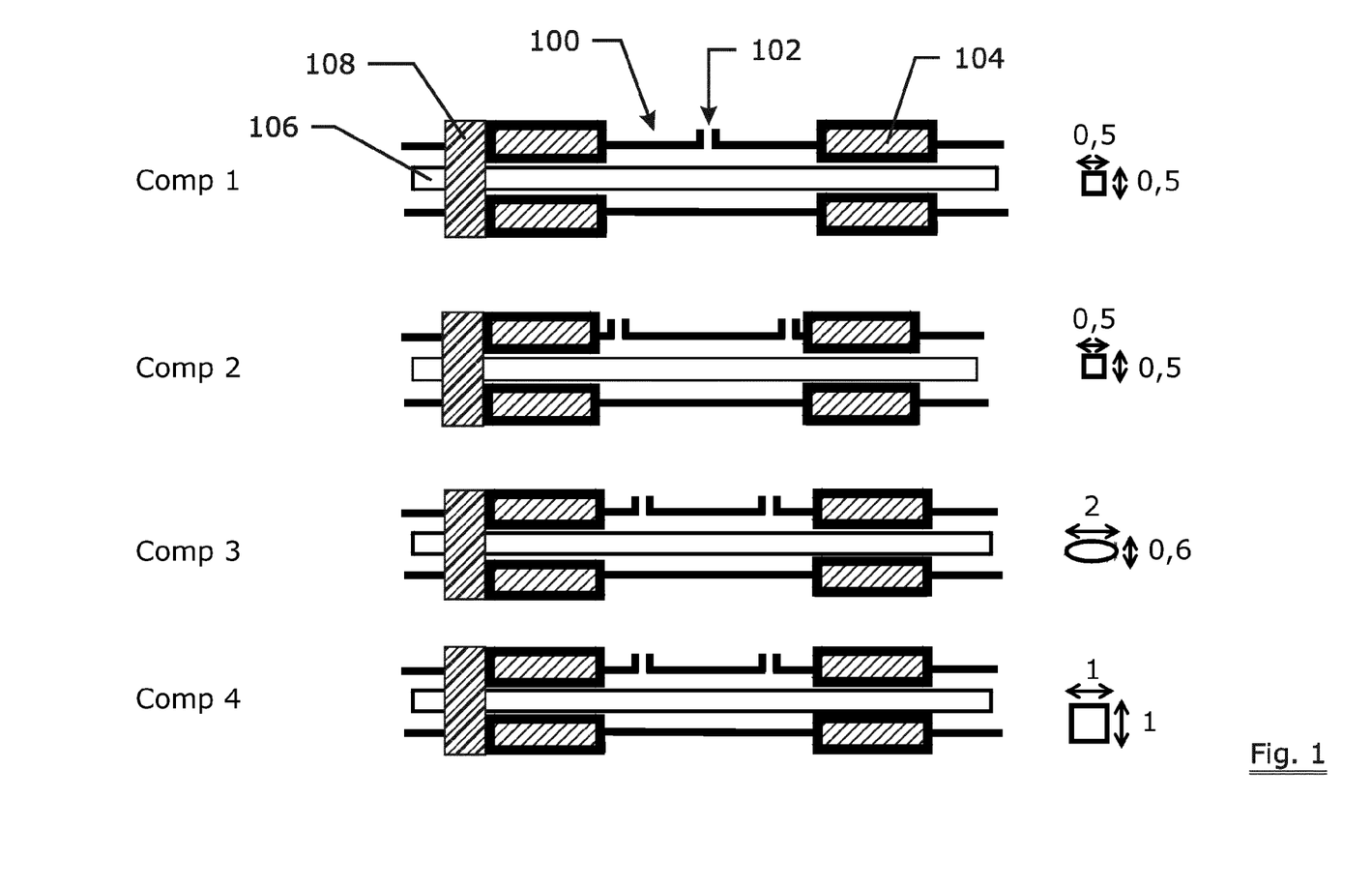
FIG. 1 describes prior-art moulds and the traces they leave on the sawing cord.

The reason why the cord is eccentrically placed is—according the inventors—that the polymer sleeves are coated on the steel rope by defective injection moulding. In injection moulding the beads threaded on the steel rope are positioned into a lower half-mould having an elongated recess corresponding to the negative of the sleeve one wants to obtain. At regular distances cavities for receiving the beads are provided. The upper half-mould (which is a mirror image of the lower half-mould) closes on the lower half-mould and polymer is injected into the recesses. After cooling the mould is opened, the finished sawing rope is taken out of the mould, shifted for positioning a new length of steel cord with beads and the injection cycle is repeated. An example of a mould is shown in FIG. 1 of US 2007/0194492 A1.

In U.S. Pat. No. 5,216,999 the eccentricity problem is recognised and solved by using an injection mould having annular protrusions (item 212 in FIG. 7) that keep the steel cord more in the centre during injection moulding. But still complete centring with this kind of mould is not possible as some clearance must remain between the cord and the annular protrusions as otherwise the cord would not be coated with polymer at the protrusions and would start to corrode there.

Eager to find a solution to this centricity problem, the inventors came up with the solution as described below.

DISCLOSURE OF INVENTION

The primary object of the invention is to eliminate the centricity problem of sawing cords. A further object of the invention is to provide a mould and a process that solves this problem. In the disclosure further new and inventive features of the mould and the process are identified that reduce waste, improve the cycle time, and reduce the damage to the polymer during processing. This results in a sawing cord that does not show the eccentricity problem, whereof the polymer does not degrade during use and that can be made efficiently, fast and with reduced material waste: a final object of the invention.

According a first aspect of the invention a mould is claimed suitable for coating a sawing cord with a polymer by injection moulding. Prior to the injection moulding, the sawing cord only comprises a steel cord whereon beads are threaded. After injection moulding the sawing cord further comprises polymer jackets in between the spaced apart beads.

'Injection moulding' is the process wherein plastic powder or plastic granules are fed from a hopper into a tube wherein a threaded feed screw is installed. The tube is heated and when a specific softening temperature is reached the feed screw pushes the softened plastic melt through the heated tube into a mould where the plastic material cools into the desired shape. In the case at hand the steel cord with the bead connected thereto are positioned in the mould prior to injecting the plastic. After injection, the feed screw may be reciprocated and a new charge of plastic pellets enters the tube. Instead of a reciprocating screw a ram injector can be used. After cooling the mould is opened and the injection moulded part—in this case a short piece of sawing cord with ten or more beads on it—is removed. The sawing cord is shifted and the following end of steel cord and beads is put into place, the mould is closed and the cycle repeats.

The mould—the wording 'mold', 'mould tool', 'mold tool' or even 'tool' is considered identical for the purpose of this application—comprises a first half-mould and a second half-mould together forming the mould. When the first and second half-mould are united, i.e. the mould is closed, a cavity forms in the mould. The cavity has a central axis closely corresponding to the central axis of the sawing cord when it is positioned in the mould. Injection of the hot plastic melt into the cavity is done through injection channels provided in said first and second half-mould. Evidently, there must be at least one injection channel present between each pair of beads. Normally more are present.

The mould is made of metal preferably a tool steel such as P-grade tool steel for example a nickel-chrome-molybdenum steel such as DIN X45NiCriMo4 (W-Nr. 1.2767, equivalent to AISI 6 F 7, 2767 ISO-B). The mould is heat treated in order to increase its hardness.

Characteristic about the mould is that the injection channels are situated at opposite sides of said axis. With 'opposite sides' is meant that a separation plane comprising the central axis and not cutting any injection channel can be identified such that injection channels can be found at either side of that plane.

By situating the injection channels at opposite sides of the central axis, the plastic will enter from both sides and the steel cord will remain better in place i.e. at the centre of the cavity. This can be achieved without having to tension the wire excessively (which is the usual obvious option taken) or without having to introduce position holders in the cavity of the mould. By having the steel cord more central to the beads, the steel cord wear at the end of the bead sleeves is diminished. Further, due to the fact that all beads are more central, the sawing cord rotates easier in the cut.

In a further preferred embodiment, the injection channels are situated in one plane comprising the axis but still at opposite sides of the central axis. For example the centres of the injection channels are in a single plane. At injection the forces exerted by the injected plastic on the steel cord at the injection channels will be more balanced.

In another preferred embodiment the number of injection channels at both sides of the separation plane are equal. This gives the best overall balance when plastic is injected from both sides.

In an even more preferred embodiment all injection channels are situated diametrically opposite to one another. Not only are they then situated in the same plane comprising the central axis, but they are also in a same plane perpendicular to the central axis. This is what is meant by 'diametrically opposite'. The injection channels are then mounted pairwise. The local balance of forces on the cord is then zero, provided both injection channels are fed equally with plastic melt.

By preference the injection channels themselves are fed by at least one feed channel through branch channels. A single feed channel is preferred that is fed by a single feed screw or ram injector as in this way any unbalance (in pressure or injection time) between different feeds is prevented. Such a feed structure is like a tree, the stem of the tree corresponding with the feed channel, the branch channels corresponding to the branches of the tree and the injection channels to the leaves on the end branches of the tree.

By preference the tree structure is a binary tree. A binary tree is a tree where every branch—or the stem—forks in exactly two branches or ends in two leaves. In the tree structure of the mould the cross section before every bifurcation is about equal to the sum of the cross sections of the branched off channels. In this way there is no decrease or increase of flow speed of the plastic melt as it transits the channels. As the ratio of channel wall area to channel volume increases, the flow resistance will increase towards the injection channels as the shear forces on the melt increase due to the viscosity of the melt.

Even more preferred is if the binary tree structure is a balanced binary tree. In a balanced binary tree the number of junctions of channels that are met when following any injection channel to the feed channel is equal for all injection channels. In a balanced binary tree the number of injection channels is thus $2^N$, 'N' being the number of bifurcations or junctions.

The most preferred is if the path followed by the plastic melt in its transit from feed channel to injection channel is equal in length for any injection channel. In this way the flow resistance met by the plastic melt in its travel from feed channel to injection channel is close to equal for every injection channel i.e. there is no unbalance between injection channels. This is an improvement to current state of the art molds wherein a single feed channel feeds directly different injection channels that are situated at different length from the feed entry.

Furthermore an equal length, balanced binary tree has the further advantage that many polymers can be processed with flow properties that are within wide boundaries. Particularly favoured polymers are rubbers, thermoplastic polyurethane or polyolefins such as high or low density polyethylene (HDPE, LDPE), polypropylene (PP). Less favoured but in particular cases possibly useful polymers are polyamide (PA), polyethylene terephthalate (PET), polyoxymethylene (POM), Polycarbonates (PC) or any other polymer that can be molten liquid enough to push through the channels.

The first and second half-mould will have a respective first and second face that face one another on closure of the mould. Both faces must very precisely match one another as any mismatch will lead to a leak in the central cavity and therefore to a less than good sawing cord. The faces of the moulds may have a non-planar shape for example two cylindrical faces that precisely match one another. Although such shapes may have some advantages in terms of better alignment to one another on closure, by far planar faces are preferred as they are easiest to machine to micron precision. Alignment of the two faces upon closure is then achieved by means of matching alignment pins and holes at the corners of the half-moulds.

The injection channels can feed the injection cavity in the direction perpendicular to the first and second face. Holes must therefore be drilled in the first and second half-mould which is not always easy. Therefore it is preferred that channels are embossed in either one or both faces of the half-moulds. Upon closure both faces will unite and the embossed channel will close and form a closed channel. For example the first face of the first half-mould can be completely flat, while the second face of the second half-mould has 'U' shaped embossed recesses in it. Upon closure of the mould the channels are formed ('U'). The channels are preferably precision milled in the first or second face of the half-mould. Alternatively preferred—for symmetry reasons—is that both faces are provided with an equal semi-channel—of semi-circular cross section—such that a complete channel with circular cross section forms upon closure of the mould. The injection channels than precisely feed the plastic melt perpendicular to the central axis. Circular cross sections are preferred as they have the lowest surface to volume ratio. The use of a of semi-channels has the additional advantage that it is very easy to remove the solidified waste material in the branch and injection channels after opening of the mould.

At least the injection channels should be formed by the said semi-channels in one of the faces. Additionally and optionally to that some intermediate branch channels can be implemented as semi-channels in the first and second face up to a certain number of bifurcations for example up to 1 or 2 or even 3 bifurcations. Exceptionally all branch channels can be implemented in the first and second face, leaving only the feed channel that is not implemented in the first and second face.

Advanced injection moulds have heated channels (sometimes called 'hot runners') in contrast to channels that are not heated ('cold runners'). In the heated channels, the polymer remains molten during subsequent shots. Non-heated channels are meant to cool down during the cycle before opening the mould. At injection non-heated channels of course heat up due to the hot plastic material passing by but this is not intentional. Non-heated channels are therefore to be found close to the injection cavity as the injection cavity must be cooled before it is opened in order to give the plastic the possibility to solidify. At every injection cycle, excess material in the non-heated channels must be removed and therefore leads to loss of material. The volume of non-heated channels should therefore be kept to a minimum.

By preference the non-heated channels are milled out in the first and/or second face and the heated channels are present in the first or second mould. For ease of design it is preferred that the plane of the heated channels are oriented perpendicular to plane of the non-heated channels.

The plastic melt should not remain in a high temperature state for too long a time as this leads to degradation of the polymer. Hence, the volume in the heated channels should not be too high as then the polymer residence time in hot condition increases. The inventors estimate the residence time '$t_r$' of the polymer in the heated channel by:

$$t_r = ((\text{Volume hot runners}/\text{Volume cold runners}) + 1) \times t_{cycle}$$

wherein 'Volume hot runners' is the total volume of all the heated channels and 'Volume cold runners' is the total volume of the non-heated channels. '$t_{cycle}$' is the total duration of a full injection cycle (e.g. from first closing of the mould to next closing of the mould). One cycle is added to take account of the residence time in the injector (reciprocating screw or ram injector). The combination of residence time and temperature should not go above a certain value for each specific polymer. For example thermoplastic polyurethanes should not remain longer than 10 to 15 minutes above there melt temperature to prevent polymer degradation.

At the closure of the mould, high forces must be exerted on the half-moulds to keep them closed as the injection pressure is large (about 400 to 1200 bar). The larger the surface under pressure on the first and second faces (i.e. the projected channel wall surface), the larger the closing force of the press must be. This limits the length of the mould as longer moulds cannot longer be held closed by the moulding press. Usually these forces are more than 100 kN or 150 kN or even more. Channels in the plane perpendicular to the first and second mould face do not add to the clamping force. Preferably these channels are heated channels as otherwise removal of solidified waste material becomes difficult. As a result the closing force can be considerably reduced if more levels of perpendicularly oriented, optionally heated channels are present. Alternatively, for the same closing force the length of the mould can be increased leading to a much improved productivity per cycle. In this way sawing cord lengths of 16 or 32 or even up to 64 beads can be processed in a single cycle.

A further improvement made by the inventors to the mould is the use of one or more mould inserts that are insertable into the first or second half-mould and that form the mould cavity for receiving the beads and the steel cord. Optionally injection and even branch channels can be implemented in such inserts. As both the sawing beads and the steel cords are relatively hard materials, an accidental non-correct alignment at the closing of the mould could lead to severe damage to the precision ground first and second faces. In case closing damage would occur, it suffices that only the insert pieces are renewed and the entire mould is saved. Like the mould the inserts are made of metal preferably a tool steel such as the ones mentioned above. Preferably inserts are heat treated in order increase their hardness.

The cavity itself has axial sections that hold the steel cord only and axial sections that hold the sawing beads and the steel cord. In the latter sections bead recesses are present for receiving the sawing beads during injection moulding. A further important improvement to the mould by the inventors is that each bead recess must have injection channels at both axial ends of the bead recess, i.e. also the first and the last bead recess must be provided with injection channels at either axial ends. This prevents that the end positioned beads would receive plastic from one side only leading to inferior fatigue behaviour during use. Such behaviour has indeed been observed in the field.

According a second aspect of the invention a process to coat a sawing cord by injection moulding using the mould as in any form described above is claimed. The process comprises the steps of:
 a. Providing a steel cord with the sawing beads connected thereon. The beads can be threaded on the steel cord in the known way or they can be closed onto the steel cord in any of the manners described in WO 2011 061166 A1. The latter method has the advantage that extremely long lengths of sawing cord can be made without having to interrupt the process.
 b. Opening the mould;
 c. As an option, the steel cord with the sawing beads thereon can be heated prior to injection moulding. Preheating the steel cord brings considerable advantages with it as it allows the molten plastic to enter in between the filaments of the steel cord before solidification. In this way steel filaments are better sealed from the outside and lead to an improved lifetime of the overall product. Heating can be done by different means such as infrared heating, hot air heating, or resistive heating.
 d. Positioning said steel cord and said sawing beads along the axis.
 e. Optionally tensioning the steel cord. A minimum of tension is required to keep the steel cord taut. Too high tension is not needed and will not help to overcome the centricity problem as only a small force is needed to push a tensioned steel cord out of its centre.

f. Then the steel cord with the beads on is enclosed by the injection cavity as the mould is closed. The closing force is applied to keep the half-moulds firmly closed.
g. The polymer is injected through the injection channels into the injection cavity. After a short cooling time the polymer solidifies.
h. The mould is opened and the length of finished sawing cord is taken out of the mould.

Thereafter a new length of steel cord with beads connected to it is shifted into the mould in replacement for the finished length of sawing cord and the whole cycle restarts.

Characteristic about the process is that the injection of the polymer is performed form both sides to the central axis of the injection cavity.

The order in which the above steps have been described is not limitative to the invention. The skilled person will understand that certain steps such as for example step 'd' (positioning of the beads) can immediately follow step 'a' (providing the steel cord) while at the same moment step 'b' (opening the mould) is performed. Also step 'e' (tensioning the steel cord) can be performed at any moment before step 'f' (closure of the mould). Step 'c' (the heating of the steel cord) can be performed also at any moment in the process as long as it precedes step 'g' (injection of the polymer).

According a third aspect of the invention a sawing cord is claimed that comprises a steel cord and sawing beads attached thereon. Between the sawing beads polymer sleeves are present. The polymer sleeves always show a little trace of the injection channel on their outer surface which can easily be seen under a magnifying glass. Specific about the sawing cord is that these injection channel traces are present at both sides of the central axis of the sawing cord. The skilled person understands that this is the 'signature' left by the above described mould in the above described process.

BRIEF DESCRIPTION OF FIGURES IN THE DRAWINGS

In the drawings the ten's and unit's digits represent like parts over different drawings while the hundred digit corresponds to the number of the figure.

MODE(S) FOR CARRYING OUT THE INVENTION

FIG. 1 shows different prior-art injection moulds 100 as deduced from sawing cords from different manufacturers (Comp 1, Comp 2, Comp 3, Comp 4). The beads 104 are threaded on a steel cord 106. Known injection moulds have injection channels only at one side of the axis and the injection channels are arranged linearly and parallel to the axis of the cord. This can be derived from the existing sawing cord itself as the polymer sleeve shape is the positive replica of the negative mould cavity. Indeed the injection channels leave a small stub at the surface that can easily be traced on existing sawing cords. Known sawing cords only show these stubs linearly and at one side of the axis. Those stubs can be square (e.g. 1×1 mm$^2$, 0.5×0.5 mm$^2$), oval (2 mm long×0.6 mm wide) or round as indicated by the cross sections at the right of each mould. Sometimes only one stub can be identified in between a pair of beads (Comp 1) but mostly there are two (Comp 2, Comp 3, Comp 4).

When cutting a sawing cord at the end of a bead sleeve, one can derive how well the polymer has entered the sleeve. On all sawing cords investigated, at least one bead did show inferior, not complete polymer ingress into the sleeve. Moreover such defective bead occurred at regular intervals (e.g. every 8$^{th}$ bead) indicative that injection at the end sleeve was always from one side, the other side being stopped by means of a kind of stopper 108. Although, after shifting of the cord in the mould, the other side of the sleeve was injected, the non-symmetric injection was still noticeable.

By analysing sawing cords that have been used in the field the inventors found a correlation between the presence of steel cord wear at the end of a sleeve and whether or not polymer ingress was total or not. Not complete ingress of polymer resulted in excessive steel cord wear at the end of the sleeve. Additionally, many sawing cords that fractured in the field did show incomplete ingress of polymer into the sleeve. And as incomplete ingress of polymer is linked to end beads in the mould it results that defective polymer penetration in an end bead is a problem.

Figure 2:
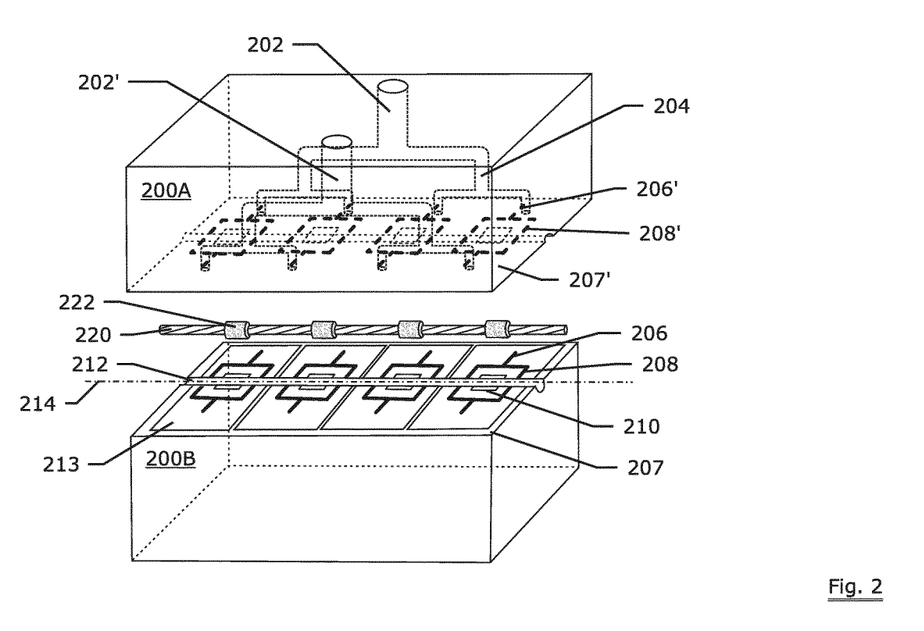
FIG. 2 describes the general principles of the invention.

FIG. 2 shows a preferred embodiment of the inventive mould. Two half-moulds 200A and 200B are shown before closure. A steel cord 220 with beads 222 threaded thereon is ready to be positioned into the mould. The elongated injection cavity has a part 212 for receiving the steel cord 220 and at regular distances an extra recess 210 for receiving the sawing beads 222. The cavity has a central axis 214. Injection channels 208 are present for injecting polymer into the elongated injection cavity. The injection channels are present at opposite sides of the central axis 214.

In the embodiment of FIG. 2 the injection channels 208 are in the plane comprising the central axis. Moreover in this embodiment the number of injection channels at either of the opposite sides of the central axis are equal namely, there are 8 at either side. In addition the injection channels 208 are arranged diametrically opposite to each other.

The mould 200A further has two feed channels 202 and 202' for feeding both side of the injection cavities. Each of the feed channels 202 and 202' split up into branch channels 204 that on their turn can split into branch channels 206. Ultimately the branch channels end up at an injection channel 208. In this way a tree structure is formed wherein the feed channel is the stem, the branch channels the branches of the tree, and the injection channels the leaves of the tree. Two such trees can be discerned, each of the trees being fed by one feed channel 202 or 202'. At each split the cross section of the channels diminishes. In an alternative embodiment (not shown) one single feed channel can feed the two channels 202 and 202'.

Although the preferred embodiment as shown in FIG. 2 is a binary tree wherein each feed channel or branch channel bifurcates in two branches, three or more channels per split (not shown) are possible also. Also in the depicted preferred embodiment each of the two trees is balanced as, when following the path of the injection channel towards the feed channel, three bifurcations are met whatever injection channel is considered. Furthermore in the tree structures of the preferred embodiment of FIG. 2 the length from the path from the exit of the injection channel towards the entry of the feed channel is equal for every injection channel considered.

In the preferred embodiment of FIG. 2 the injection channels are formed by two semi-channels 208, 208' embossed in the faces 207 and 207' of the two half-moulds 200A and 200B. When the mould is closed, the two semi-channels 208, 208' form an injection channel of circular cross section. Also a branch channel then forms as the two semi-channels 206, 206' close upon one another. The use of semi-channels makes it very easy to remove the solidified waste material after opening of the mould.

Figure 3A:
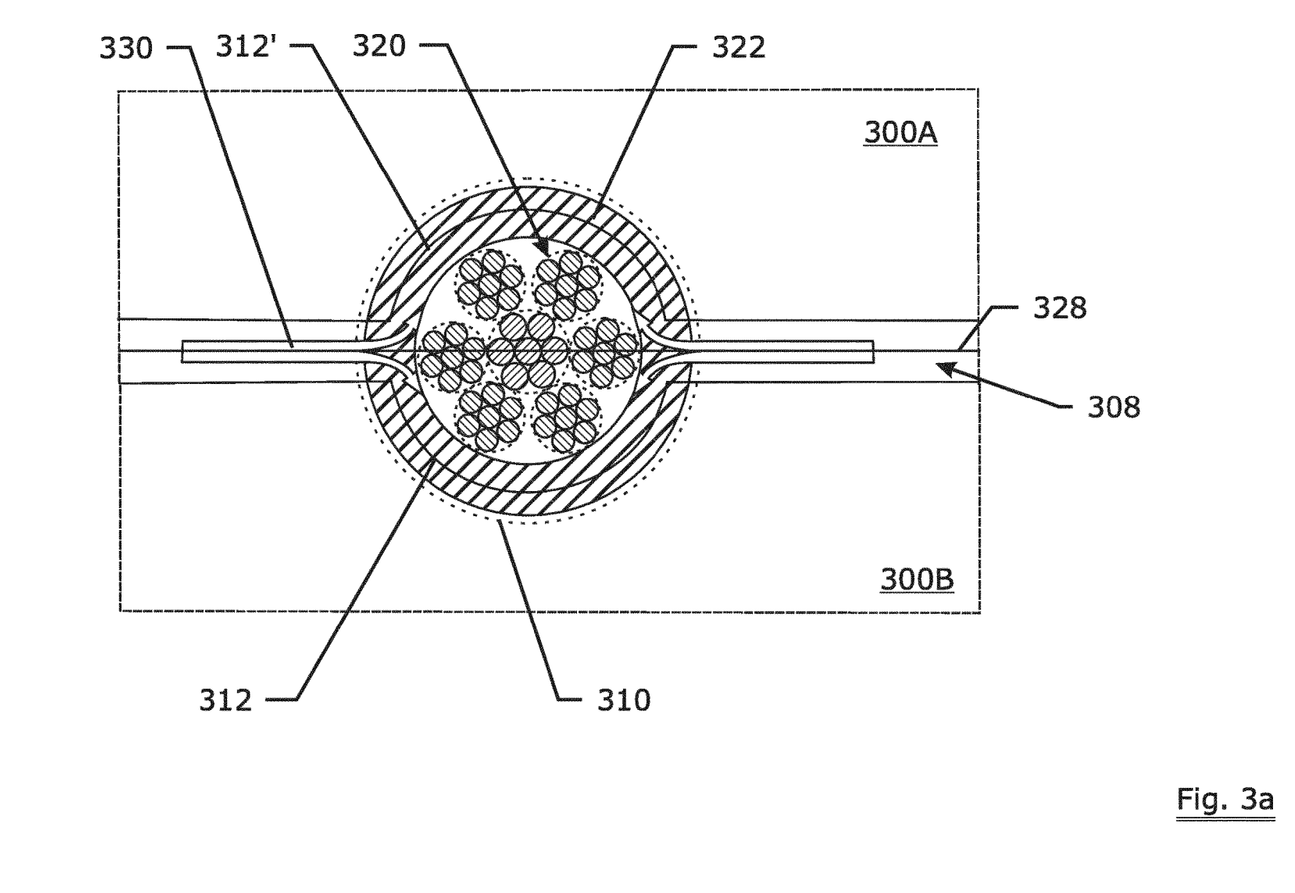
FIGS. 3a and 3b, describe two different preferred embodiments of the invention.

FIG. 3a shows how a cross section through the closed mould by a plane perpendicular to the central axis and through two diametrically opposed injection channels in between two beads looks. The two half moulds are indicated with 300A, 300B. The steel cord 320 with beads 322 threaded on it is held in the cavity formed by the semi-circles 312, 312'. The beads 322 are held in a slightly larger bead recess 310. Injection channel 308 forms when the faces 328 of the half-moulds meet. The steel cord is in this case a 7×7 steel cord i.e. consisting of a core strand with a king wire and 6 surrounding wires forming a king strand, and six outer strands each also made of king wire surrounded with outer wires, the outer strands being twisted around the king strand. The arrows 330 indicate how the melt flows into the cavity equally from both sides and divides itself above and below the central axis of the steel cord 320.

Figure 3B:
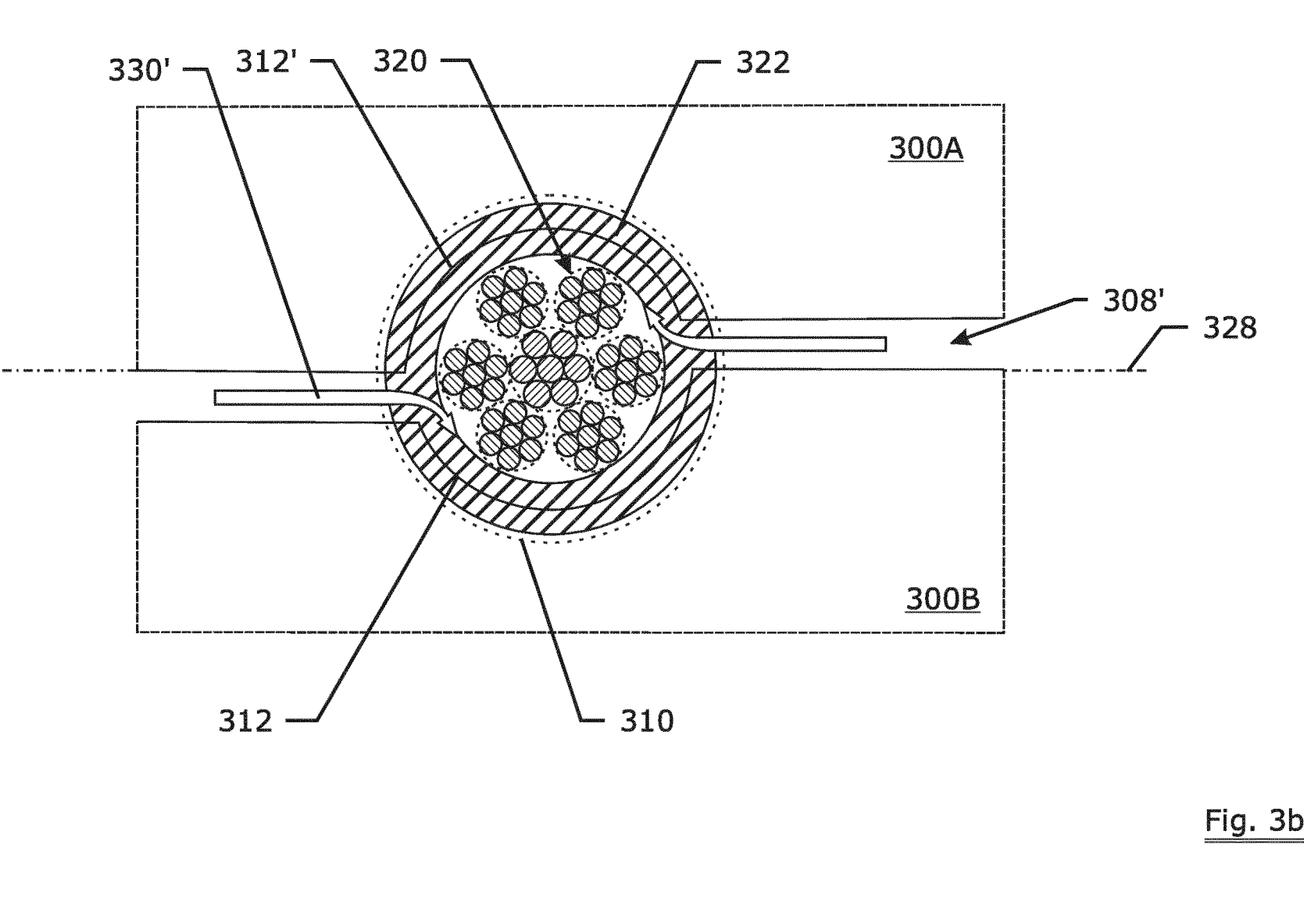

An alternative embodiment is shown in FIG. 3b. Here the injection channel 308' is formed in the half mould 300A and is closed by the mating flat part of the half-mould 300B. Hence channel 308' is completely above face 328 of half-mould 300B. The situation is reversed on the opposite side of the sawing cable where the injection channel is machined out of the half-mould 300B and is closed by the flat part of half-mould 300A. This arrangement results in an off-axis injection flow 330'. The inventors claim that in this way also a good centricity of the steel cord 320 can be obtained.

Returning now to FIG. 2. The channels 204 and 202 in the half-mould 200A are all heatable. The channels 206, 206' 208, 208' in the faces 207, 207' are not heated.

The injection cavity 210, 212, the injection channels 208, 208' and branch channels 206, 206' are implemented in inserts 213 that can easily be replaced if damage would occur to those inserts possibly due to misalignment of the sawing bead 222 and/or steel cord 220.

Note that each bead recess 210 has two injection channels at either axial end of said bead recess. In this way also the end beads will show a sufficient degree of polymer ingress.

A careful balance has to be made in terms of the number of bifurcation levels for hotrunners and coldrunners:
 Let 'N' be the total number of bifurcation levels in the whole tree;
 Let 'n' be the number of bifurcation levels that feed into non-heated branch channels or injection channels;
 Let 'm' be the number of bifurcations that feed into heated branch channels or feed channels. Hence N=n+m;
 So there are $2^N$ injection channels per tree. In the embodiment of FIG. 2, n=1, m=2 and N=3 i.e. $2^3$ injection channels per tree.

| Increasing ⇨ | cold bifurcations 'n' | hot bifurctions 'm' |
| --- | --- | --- |
| Advantage | Lower cost<br>Low hot polymer residence time | Less cooling time in cycle<br>Lower clamping force<br>Less waste material |
| Disadvantage | More waste material<br>Higher clamping force<br>More cooling time in cycle | Longer hot polymer residence time<br>Higher cost |

With 'Lower cost' is meant 'lower cost for building the mould'. Different embodiments wherein N was kept constant on 5 (32 injection channels) but the number of hot bifurcations were considered resulting in the following results:

| N is divided in ... ⇩ | Cooling time (sec) | Clamping force (kN) | Polymer hot residence time |
| --- | --- | --- | --- |
| n = 5, m = 0 | 97 | 1200 | 0 cycles |
| n = 2, m = 3 | 26 | 550 | 7 cycles |
| n = 1, m = 4 | 9 | 250 | 14 cycles |

Given the fact that some mounting time for the cable must be provided in the cycle time, the inventors found the embodiment (n=2; m=3) to be the optimum choice. Hence in total there are 8 heated branch channels that feed non-heated bifurcations ending in 32 injection channels.

The process for making a sawing cord is an injection moulding process with following particular steps:
 A steel cord with sawing beads connected thereon is provided. By preference the beads can still be shifted slightly on the steel cord;
 It is preferred that the steel cord is preheated in one or another way for example by heating in a tubular oven. Preheating of the steel cord makes the polymer solidify slower. In this way the polymer can better penetrate between the filaments before it 'freezes'. Injecting hot polymer onto a cold steel cord makes the polymer solidify immediately thereby blocking the further penetration of polymer between the filaments of the steel cord;
 The mould is opened prior to placement of the steel cord with beads. One will strive to keep the mould closed as much as possible to prevent excessive cooling of the half-mould and to keep them on a controlled temperature.
 The steel cord with beads is place in the injection cavity of the lower half-mould. It is held taut so that the beads and the cord remain nicely in place.
 The mould is closed and polymer is injected into the injection cavity.
 While the next stretch of cord is being preheated, the polymer in the mould solidifies.
 When the mould is opened, the sawing cord is pulled out from the lower mold, and the next eight beads are introduced.
 The sawing cord is finished by removal of the waste polymer formed in the injection channels and the not heated channels. Between two beads four stubs, two by two opposite to the sawing rope axis remain as a positive replica of the mould that has been used.

The invention claimed is:
1. A mould for coating a sawing cord with a polymer by injection moulding comprising a first half-mould and a second half-mould, said first half-mould and said second half-mould forming an elongated injection cavity when united, said injection cavity having a central axis, said first half-mould and said second half-mould being provided with injection channels for injecting polymer into said injection cavity, said injection channels being situated at opposite sides of said central axis,
 wherein said injection cavity further comprises bead recesses configured to receive sawing beads during injection moulding, each of said bead recesses, including a first bead recess and a last bead recess of said bead recesses, having injection channels at both axial ends thereof.

2. The mould of claim 1, wherein said injection channels are situated in a plane comprising said central axis.

3. The mould of claim 2, wherein a number of injection channels at either of said opposite sides of said central axis is equal.

4. The mould of claim 3, wherein said injection channels are situated diametrically opposite to one another.

5. The mould according to claim 1, wherein
said injection channels are fed by at least one feed channel through branch channels,
said feed channel, branch channels and injection channels comprising a tree structure,
said at least one feed channel and part of said branch channels are heatable channels, and remaining branch channels and said injection channels being non-heatable channels,
a volume of said heatable channels is less than four times a volume of said non-heatable channels, and
said volume of heatable channels is more than 1.5 times said volume of said non-heatable channels.

6. The mould according to claim 5, wherein said tree structure is a binary tree structure.

7. The mould according to claim 6, wherein said binary tree structure is a balanced binary tree structure.

8. The mould according to claim 1, wherein
said first half-mould and said second half-mould have a first face and a second face, respectively, said first face and said second face facing one another when united, and
said first face or said second face has channels embossed therein such that one or more of said injection channels form when said mould is united.

9. The mould according to claim 8, wherein said first face and said second face have semi-channels embossed therein such that one or more of said infection channels are formed by said semi-channels when said mould is united.

10. The mould of claim 5, wherein said injection channels and all or part of said branch channels form when said mould is closed.

11. The mould according to claim 1, wherein said infection cavity and one or more of said injection channels are formed by one or more mould inserts, said mould inserts being insertable in said first half-mould or said second half-mould.

12. A process to coat a sawing cord by injection moulding using the mould according to claim 1, said process comprising the steps of:
providing a steel cord with sawing beads connected thereon;
opening said mould;
heating said steel cord;
positioning said steel cord and said sawing beads along said central axis;
tensioning said steel cord;
enclosing said steel cord and sawing beads in said injection cavity of said mould by closure of said mould;
injecting polymer into said injection cavity from opposite sides toward said central axis; and
opening said mould,
wherein each of said beads, including said first bead recess and said last bead recess, is injected with polymer from both axial ends thereof.

13. The mould according to claim 8, wherein
said opposite sides define a first side and a second side opposite to said first side, and
said first face and said second face having channels embossed therein such that
at said first side, said channels are formed by a flat face of said first half-mould and said channels embossed in said second half-mould, and
at said second side, said channels are formed by said flat face of said second half-mould and said channels embossed in said first half-mould.

14. The mould of claim 1, wherein said injection channels form when said mould is closed.

15. The mould according to claim 1, wherein said injection cavity is formed by one or more mould inserts, said mould inserts being insertable in said first half-mould or said second half-mould.

16. A process to coat a sawing cord by injection moulding using the mould according to claim 1, said process comprising the steps of:
providing a steel cord with sawing beads connected thereon;
opening said mould;
positioning said steel cord and said sawing beads along said central axis;
enclosing said steel cord and sawing beads in said injection cavity of said mould by closure of said mould;
injecting polymer into said injection cavity from opposite sides toward said central axis; and
opening said mould,
wherein each of said beads, including said first bead recess and said last bead recess, is injected with polymer from both axial ends thereof.

17. The mould according to claim 1, wherein
said injection channels are fed by at least one feed channel through branch channels,
said feed channel, branch channels and injection channels comprising a tree structure, and
said at least one feed channel and part of said branch channels are heatable channels, and remaining branch channels and said injection channels being non-heatable channels.

* * * * *